INVENTOR
CHARLES C. RIPLEY
By John R. Duncan
ATTORNEY

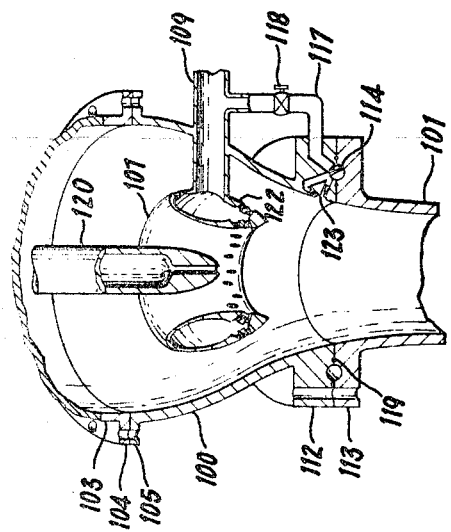
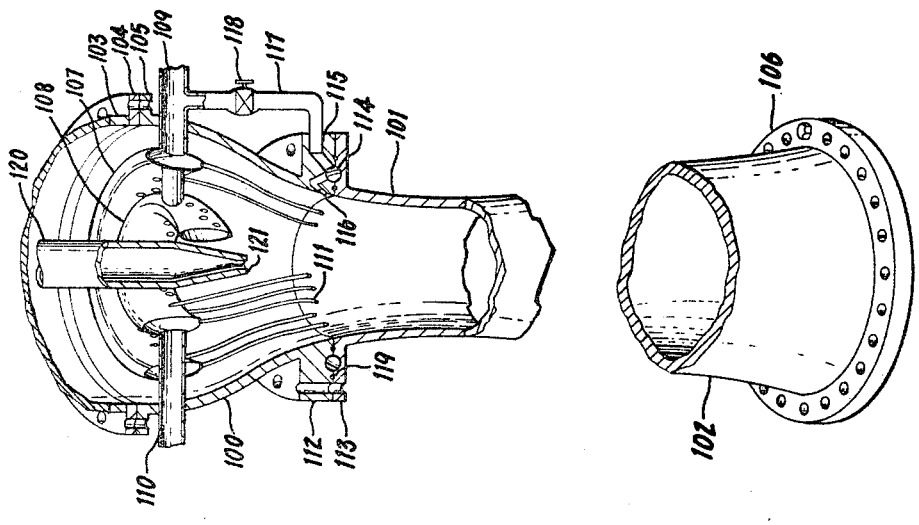

United States Patent Office
3,575,807
Patented Apr. 20, 1971

3,575,807
STEAM COOLED REACTOR OPERATION
Charles C. Ripley, San Jose, Calif., assignor to
General Electric Company
Filed Jan. 29, 1968, Ser. No. 701,229
Int. Cl. G21c 15/24
U.S. Cl. 176—56        9 Claims

ABSTRACT OF THE DISCLOSURE

A steam circulating system for a steam cooled nuclear reactor is disclosed. This system includes a start-up technique in which a steam thermopresser acts first as a contact condenser while the reactor is preheating then as a jet pump while the reactor coolant circulation is initiated, and finally as a thermopresser during normal reactor operation.

BACKGROUND OF THE INVENTION

Nuclear chain fission reactions and the reactors in which they take places are now well known. A typical reactor includes a chain reacting assembly or core made up of nuclear fuel material contained in fuel elements. The fuel material is generally encased in a corrosion resistant heat conductive shell or cladding. The reactor core, made up of a plurality of these elements in spaced relationship, is enclosed in a container through which the reactor coolant flows. As the coolant passes between the spaced fuel elements, it is heated by energy given off during the fission reaction. The heated coolant then leaves the reactor, the heat energy is used to perform useful work, and the now cooled coolant is recycled back to the reactor.

In typical commercial reactors, the coolant is water, which may be heated under pressure or evaporated in the core. Recently, reactors have been developed using steam as the coolant. In reactors of this type, saturated steam enters the reactor, is superheated as it passes through the core, leaves the reactor where a portion is expanded to low pressure and condensed while performing useful work, and the remainder is desuperheated while evaporating feedwater which is recycled to the reactor. This system is preferred for many applications, since steam at high temperatures and pressures is often more useful than the lower pressure and temperature steam produced by conventional pressurized water and boiling water reactors. For example, electrical power generating turbines are generally more efficient and economical when driven by superheated rather than saturated steam.

A major problem, however, with steam cooled reactors results from the large amounts of steam which must be recirculated through the reactor core. Generally, most of the superheated steam from the reactor must be used to evaporate feed water in a desuperheater, with only a relatively small portion having the desired degree of superheat passing directly to the load, such as a turbine. Recirculation of the mixture of evaporated feedwater and desuperheated reactor steam back to the reactor requires large pumps and large amounts of energy. Clearly, significant savings can be obtained through small improvements in steam recirculation in steam cooled reactors.

Also, there are problems in simply and safely starting up a steam-cooled reactor from a "cold" condition in which the reactor core is flooded with water and core reactivity, and thus heat output, is at a low level, to normal operating conditions in which saturated steam passes through the core at a high rate and a very large quantity of heat is being continuously produced in the core.

Recently, it has been found that the "steam thermopresser" is a highly efficient means for driving saturated steam at a high pressure through the core of a steam cooled reactor. The system using a steam thermopresser is disclosed and claimed by D. R. Hines in copending application Ser. No. 701,228, filed concurrently herewith and assigned to the assignee of the present invention.

Conventional start-up procedures, however, are not suitable for use with such a system.

When the steam cooled reactor is flooded with water when shut-down, it is desirable to first circulate the water through the core, convert the water to steam, then convert the system to circulate steam as the reactor coolant. This transition is often difficult to accomplish. It is highly desirable that the number of penetrations through the reactor pressure vessel be as few as possible. Also, it is economically undesirable to use a large amount of external equipment, piping, etc., during start-up where the equipment performs no continuing necessary function during normal reactor operation.

Thus, the need remains for a simple and safe system for starting up a steam cooled reactor using steam thermopressers to circulate steam coolant through the reactor core.

SUMMARY OF THE INVENTION

It is, therefore, an object of this invention to provide a start-up system for steam-cooled reactors which overcomes the above problems.

It is another object of this invention to provide a simple and safe method and apparatus for starting up a steam-cooled reactor using steam thermopresser coolant circulating means.

Another object of this invention is to provide a coolant circulating system operable with liquid or steam coolant.

Still another object of this invention is to provide a reactor start-up system minimizing the number and size of reactor pressure vessel penetrations.

The above objects, and others, are accomplished in accordance with this invention by providing a start-up system in which the thermopresser structure acts as a contact condenser to heat water in the reactor, then as a jet pump during start-up, which gradually converts to steam thermopresser operation while simultaneously heating the various equipment elements and the piping system to operating temperature.

This is a simple and economical system since one piece of process equipment performs multiple functions. Start-up equipment outside of the reactor is limited to a simple conventional boiler to supply start-up steam to drive the thermopresser in the jet-pump mode.

This is an especially safe and simple system, since only one pressure-vessel penetration is added (for the start-up steam line) and a large number of external start-up pumps and associated piping are not required. Also, start-up is gradual, with gradual heating of all parts while pressure is slowly increased. The reactor may be easily and quickly shut-down at any time during start-up, with coolant circulation continuing as needed after shut-down, with the thermopresser operating in the jet pump mode.

BRIEF DESCRIPTION OF THE DRAWINGS

Various details of the invention and several preferred embodiments thereof may be further understood upon reference to the drawings, wherein:

FIG. 2 shows a preferred embodiment of a thermopresser convertible to jet pump operation during start-up;

FIG. 3 shows an alternative nozzle assembly useful in the device of FIG. 2;

DETAILED DESCRIPTION OF THE DRAWINGS

Figure 1:
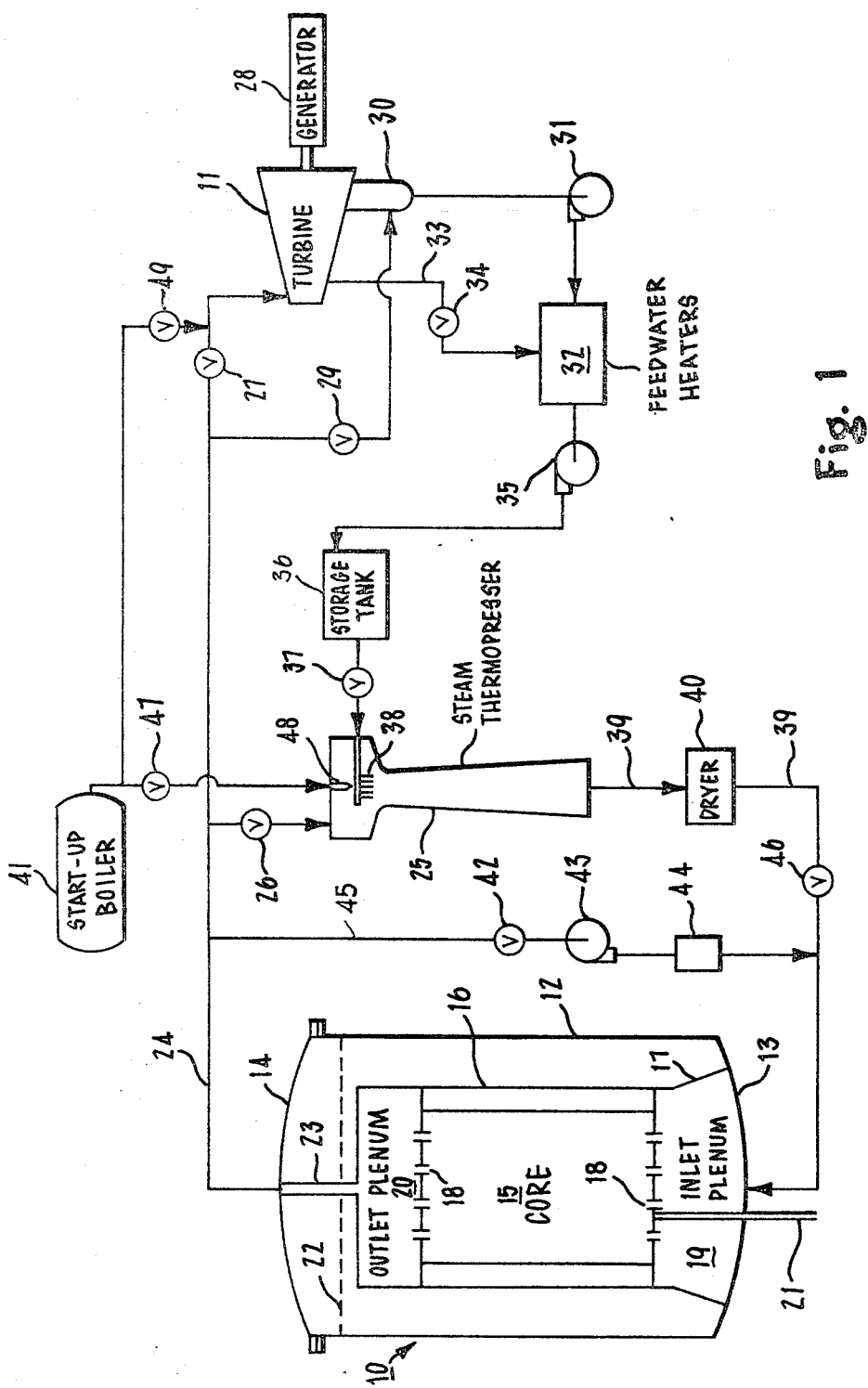
FIG. 1 shows a simple schematic flow sheet for a nuclear power plant using the system of this invention.

Referring now to FIG. 1, there is seen a simple schematic diagram of a nuclear power plant, including a nuclear reactor 10 to supply steam to turbine 11. Reactor 10 includes a generally cylindrical pressure vessel 12 closed at the bottom by a dish-shaped lower head 13 and at the top by a removable dome-shaped head 14. Within pressure vessel 12 is located a core 15 mounted within a shroud 16 supported by a flaring skirt portion 17. Openings, schematically shown at 18, are provided through core 15 to permit the passage of coolant therethrough. Saturated steam coolant enters core 15 from lower inlet plenum 19 and leaves the core after being superheated to upper outlet plenum 20. Reactivity of core 15, and thus output, is controlled by control rods entering the core through the bottom of the reactor. Only one control rod is shown at 21, for clarity. The annular space between shroud 16 and cylindrical wall 12 of the pressure vessel is filled with water to a level indicated by dashed line 22.

During steady operation of the reactor, superheated steam leaves outlet plenum 20 through riser 23 and steam line 24. A major portion of the superheated steam enters thermopresser 25 through valve 26. The remainder of the superheated steam enters turbine 11 through valve 27. The steam drives turbine 11, which in turn drives generator 28 to produce electricity. Bypass line valve 29 is closed during steady operation. The steam is condensed in main condenser 30. Condensate is pumped by condensate pump 31 to feedwater heaters 32. The condensate is heated by extraction steam from turbine 11 through line 33 and valve 34. Condensate is pumped from feedwater heaters 32 by pump 35 to storage tank 36. Water from storage tank 36 is metered by valve 37 to spray nozzle array 38 in the throat section of thermopresser 25. During steady operation, water will enter and leave storage tank 36 at substantially equal rates. When the large quantity of superheated steam passes through the narrow thermopresser throat, a fine spray of water is injected into the superheated steam stream. The water is evaporated into steam, desuperheating the superheated driving steam while effecting a pressure increase in the diverging section of the thermopresser. This now-saturated steam returns to reactor inlet plenum 19 through line 39. If desired, a steam dryer 40 may be included in line 39 to remove any entrained water in the steam. Water collected in dryer 40 may be returned to the feedwater lines.

During reactor start-up, it is necessary that an outside source of steam be provided. A separate, fossil-fueled boiler 41 is provided to initially supply steam to the system.

When the power plant is in a shut-down condition, reactor 10, including core 15 and plenums 19 and 20, is filled with water. Control rods 21 are fully inserted to keep heat generation in core 15 at the lowest possible level. The temperature of this water is kept low by a recirculation system including valve 42, recirculation pump 43 and heat exchanger 44 in line 45. While the reactor is shut down, the recirculation loop is isolated by closing valves 26, 27, and 46. Water is pumped through heat exchanger 44, where it is cooled, at a rate sufficient to maintain the desired maximum temperature in the reactor.

As the first step in starting up the power plant, valve 42 is closed, valves 26, 46, and 47 are opened and steam from start-up boiler 41 is gradually fed into thermopresser 25 through a jet pump nozzle 48 located in thermopresser 25 just before the throat section. Water now circulates through the thermopresser, line 39, inlet pulenum 19, core 15, outlet plenum 20, riser 23, line 24, and valve 26 back to the thermopresser. The steam from start-up boiler 41 both gradually heats the water and continues circulation. As this steam condenses, bypass valve 29 is opened sufficiently to drain sufficient water from the system to maintain pressure in the reactor at the desired level. Water drained off through valve 39 to main condenser 30 may be pumped to storage tank 36 for retention. At this time, thermopresser 25 is functioning as a contact condenser.

While the temperature and pressure of the coolant circulating through the reactor are being increased, valve 49 may be opened, admitting steam to turbine 11 to warm up this part of the system. Although steam from the reactor could be used to warm up the turbine later in the start-up process, it is desirable to use the outside steam, since reactor steam may contain small amounts of radioactive materials, which might leak through cold turbine seals.

As the pressure and temperatures in the reactor reach the desired values, typically 1400 p.s.i. and 600° F., some of the water in the reactor is evaporated and the remainder is blown out through line 24 and valve 29 to the main condenser as steam flow increases, unflooding the core. At this time, saturated steam is being circulated through the reactor and thermopresser. Thermopresser 25 is now acting as a jet pump, with steam admitted through the jet pump nozzle recirculating saturated steam through the reactor. Pressure in the reactor is maintained at the desired level by venting excess steam through valve 29 to the main condenser.

Production of superheated steam is now begun by slowly withdrawing control rods 21 to increase heat production in core 15. Simultaneously, feeding of water to spray nozzles 28 is begun by gradually opening valve 37. The thermopresser is still operating as a jet pump, since only enough water is admitted through spray nozzles 38 to desuperheat steam entering from the reactor through valve 26. At this time, the turbine may be started rolling either by admitting a large quantity of steam through valve 49 or by opening valve 27 to admit reactor steam. As valve 27 is gradually opened, valve 29 is gradually closed, until all of the steam not passing through the thermopresser passes through the turbine.

As heat output increases in core 15, steam reaching thermopresser 25 through line 24 and valve 26 has an increasing degree of superheat, requiring an increasing amount of water from storage tank 36 through valve 37. Thus, admission of steam through jet pump nozzle 48 can be gradually discontinued. Then, the thermopresser is operating in the full steam thermopresser mode. Power can be further raised by increasing the heat output of core 15 while increasing the quantity of water sprayed through nozzles 38 a proportional amount.

Valves 47 and 49 are closed, allowing start-up boiler 41 to be put on standby.

The above process is substantially reversed in shutting down the plant. Again, as heat output drops in core 15 as control rods 21 are inserted, steam from start-up boiler 41 will be admitted through the jet pump nozzle so that the thermopresser can act as a jet pump and circulate coolant through core 15 so long as necessary to permit gradual cooling of the reactor.

Figure 4:
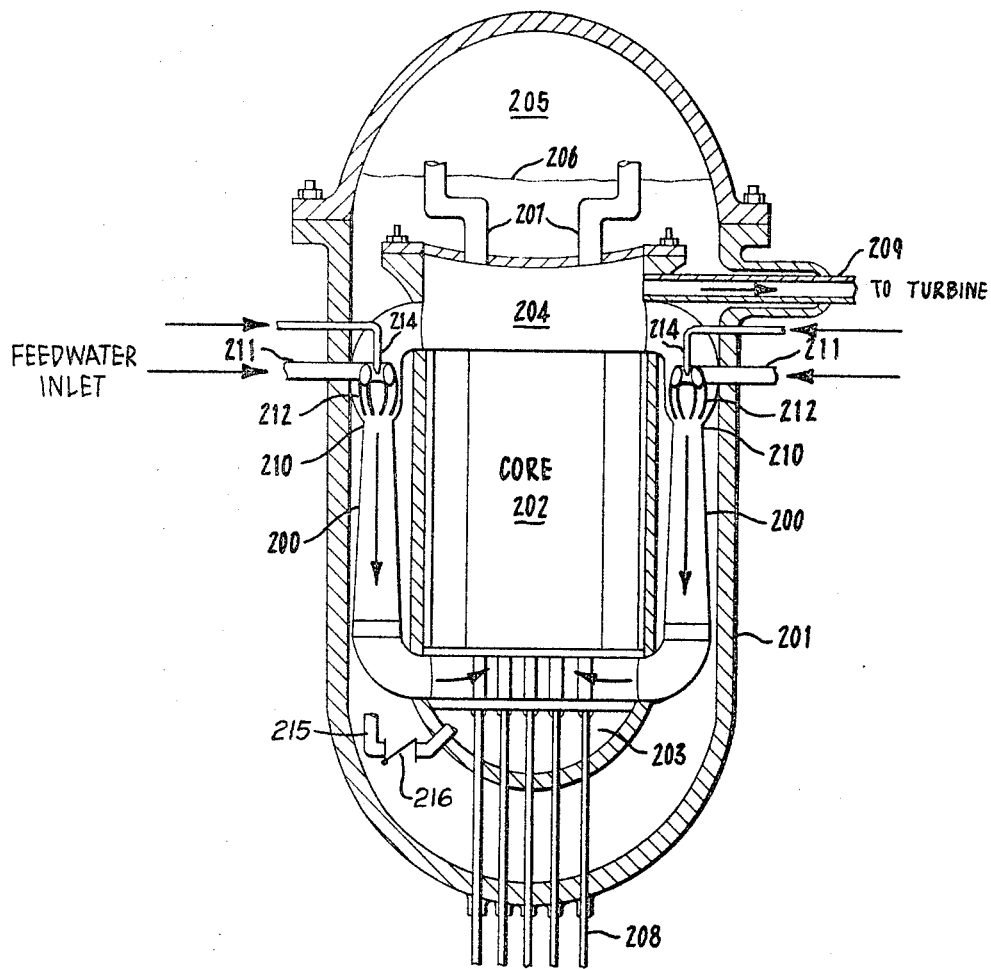
FIG. 4 shows a preferred arrangement of the convertible steam thermopresser in a nuclear reactor pressure vessel.

A detailed view, partly broken away, of a steam thermopresser especially useful in the system of this invention is shown in FIG. 2. This steam thermopresser may be used either outside of the reactor pressure vessel, as shown in FIG. 1, or within the pressure vessel, as shown in FIG. 4. The body of the thermopresser includes a sharply converging inlet section 100, a narrow throat section 101 and a diverging diffuser section 102. Inlet pipe 103, through which coolant from the reactor outlet plenum is admitted, is secured to the thermopresser body by bolts through flanges 104 and 105. A flange 106 is provided at the end of diffuser section 102 to permit connection to reactor coolant feed piping.

A spray system is provided at or just before throat section 101 to spray finely divided water droplets into the steam stream passing through the thermopresser. This system, in the embodiment of FIG. 2, includes two streamlined manifold rings 107 and 108 located in inlet section 100. Water is fed to manifold rings 107 and 108 through pipes 109 and 110, respectively, which also serve to support the manifold rings in position. A plurality of thin tubes 111 extend from manifold rings 107 and 108 into throat section 101. Only a few of these tubes are shown for clarity. Each tube has one or more small spray holes in its downstream end through which water is sprayed into throat section 101 as fine droplets, whereupon it is evaporated. Flanges 112 and 113 which secure inlet section 100 to throat section 101 have circular grooves in their mating faces, forming a toroidal channel 114 when the flanges are assembled. Water is admitted to channel 114 through opening 115 in flange 112. A plurality of spray nozzles 116 are located in openings in the wall of inlet section 100, which openings are connected with channel 114. Only one of nozzles 116 is shown in FIG. 2 for clarity. Water is fed to nozzles 116 through pipe 117, controlled by valve 118. Elastic O-rings 119 are provided between flanges 112 and 113 adjacent channel 114 to prevent leakage of water. Slight leakage is not significant where the thermopresser is located within the reactor pressure vessel as shown in FIG. 4, since there the thermopresser is surrounded by water.

A single large jet pump nozzle 120 is provided for the admission of steam from a start-up boiler during plant start-up as discussed above. Nozzle 120 is located on the thermopresser center line, in the inlet section upstream of the throat at the optimum position for jet pump operation. In the embodiment shown in FIG. 2, jet pump nozzle 120 has a tapering outlet section 121 in the approximate form of a truncated cone.

For optimum steam thermopresser performance, the fluid density should not be increased until the maximum steam stream velocity is reached. Thus, the spray of water droplets should take place uniformly across the throat section at its narrowest point. Maximum steam stream velocity should be as high as possible to produce highest output pressure. To minimize friction losses, the length to diameter ratio of the diffuser section should be as short as possible, consistent with a smooth transition from high velocity to high pressure in the steam stream. A ratio of overall length to throat diameter in the range of from about 5:1 to about 30:1 gives excellent results. It is highly desirable that the spray from nozzles 111 and 116 be in the form of very small droplets, to decrease energy losses in accelerating droplets to stream velocity as they evaporate and cause them to have the shortest possible evaporation time.

The structure shown in FIG. 2 is capable of performing efficiently as a jet pump, then as a combined jet pump and thermopresser, and finally as a steam thermopresser during start-up and steady plant operation. Both the jet pump nozzle 120 and the thermopresser water spray nozzles 111 and 116 are located for optimum performance without any problems of mechanical interference of one system with the other.

An alternative arrangement of jet pump nozzle and water spray nozzles in a thermopresser is shown in FIG. 3. Here, jet pump nozzle 120 has a rounded exterior and a generally cylindrical interior configuration. Manifold 107 surrounds the jet pump nozzle in the thermopresser inlet section. Water enters manifold 107 through pipe 109 which also serves to support the manifold in position. The water spray means here consists of a plurality of pairs of small water jets 122, with the two jets from each pair impinging so as to produce a fine spray of very fine droplets. A plurality of pairs of similar jets 123 are also located around the inner wall of inlet section 100. Only one of these pairs of jets 123 is shown, for clarity. Any other suitable jet pump nozzle configuration or water spray arrangement may be used in a thermopresser such as those shown in FIGS. 2 and 3.

FIG. 4 shows an especially preferred arrangement of steam thermopressers in a nuclear reactor pressure vessel. As seen in FIG. 4, the thermopressers 200 are located within the reactor pressure vessel 201 in a water-filled annulus between core 202 and pressure vessel 201. Vertical passages through core 202 permit coolant to pass through the core from inlet plenum 203 to outlet plenum 204. Outlet plenum 204 is vented to a steam space 205 above water line 206 by means of vents 207. During steady plant operation, saturated steam enters the core from inlet plenum 203, is heated to the desired degree of superheat in the core under control of control rods 208 and passes to outlet plenum 204. A portion of the superheated steam leaves the reactor through pipe 209 to the turbine or other load. The remainder of the superheated steam passes downwardly through thermopressers 200 to the inlet plenum for recirculation. As this portion passes through the throat sections 210 of the thermopressers, water entering through pipes 211 is sprayed from spray nozzles 212 as finely divided droplets into the superheated steam which is moving at maximum velocity. While the schematic drawing shows separate feedwater pipes 211 each pentrating vessel 201 for clarity, in practice it is preferable to have a single penetration, with an annular manifold delivering water to each thermopresser spray nozzle array. The water droplets evaporate while simultaneously desuperheating the superheated steam. As the resulting saturated steam passes through the diffuser sections of the thermopressers, pressure increases so that saturated steam of the desired quantity at a suitable pressure enters inlet plenum 203.

Jet pump nozzles 214 are provided for the introduction of steam from an outside source during start-up of the plant, as discussed above. Pipe 215, with check valve 216, is provided so that water may be admitted to plenums 203 and 204 and core 202 during periods when the reactor is shut down. Over spraying of water from an external source for cooling and/or flooding the reactor during reactor shut-down may be done through the water spray nozzles or the jet pump nozzles by means of switchable valves (not shown) connecting the water sources to the nozzles.

While the embodiment shown in FIG. 4 uses steam upflow through the reactor core and down-flow through the thermopressers, other arrangements may be used, if desired. For example, by merely inverting the thermopressers, steam may be made to flow up through the thermopressers and down through the core, with the superheated steam exit to the turbine located at the lower plenum. Also, the thermopresser array could be located coaxially at one end of the core, so that steam would pass in the same direction through the thermopressers and the core. Generally, however, the arrangement shown in FIG. 4 is preferred, since it is compact, easily serviced, and permits superheated steam to be taken off near the top of the reactor for use in a turbine.

DESCRIPTION OF A PREFERRED EMBODIMENT

A typical large nuclear power plant of the sort schematically shown in FIG. 1, using an arrangement of steam thermopressers within the reactor pressure vessel as shown in FIG. 4, will produce about 1000 mwe. Since such a plant has an energy conversion efficiency of about 41%, the reactor core is designed to produce about 2424 mwt.

In full power, steady operation, this plant produces about $28 \times 10^6$ lb./hr. of superheated steam at about 1400 p.s.i.a. and about 950° F. About $8.7 \times 10^6$ lb./hr. of the superheated steam is piped to the turbine, which it reaches at a pressure of about 1350 p.s.i.a. The remaining $19.3 \times 10^6$ lb./hr. of superheated steam enters the thermopressers. Four thermopressers are arranged in the annular space between the reactor core and pressure vessel to receive this steam. Each thermopresser has a length of about 10 feet from the entrance of the converging inlet section to the end of the diverging diffuser section. The thermopressers each include a jet pump nozzle and a water spray assembly as shown in FIG. 2. The water injection means is located at the throat section, about 2.1 feet from the entrance to the inlet section. The entrance diameter is about 2.08 feet, throat diameter is about 1.05 feet and diffuser exit diameter is about 2 feet. About $2.2 \times 10^6$ lb./hr. of feedwater at a temperature of about 500° F. and a pressure of about 1500 p.s.i.a. is sprayed into the throat section of each thermopresser. At the entrance to the inlet section, steam velocity is 262 ft./sec., pressure is about 1392 p.s.i.a., and temperature of the superheated steam is about 948° F. At the throat section, velocity has increased to about 1209 ft./sec. while steam temperature and pressure have dropped to about 902° F. and 1152 p.s.i.a. About $7 \times 10^6$ lb./hr. of saturated steam at a velocity of about 200 ft./sec., a pressure of about 1509 p.s.i.a. and a temperature of about 600° F. leaves each diffuser exit and enters the core inlet plenum. This saturated steam passes through the core where it is again superheated and the cycle is repeated.

A plant having the above described characteristics may be easily and economically started up from a cold condition by the technique of this invention.

During a shut-down period the reactor, including the inlet and outlet plenums and the core, is filled with water at substantially atmospheric pressure. The water is maintained at a temperature below about 125° F. by slowly circulating it through an external heat exchanger. The water exits through the turbine steam line and returns through the jet pump nozzles, which aid in circulating the water. Closed valves isolate the reactor and water circulation system from the remainder of the plant during shut-down.

Start-up is begun by feeding saturated steam at about 1600 p.s.i. to the jet pump nozzles. The water in the reactor is circulated and heated as this steam condenses. The thermopressers are at this time acting primarily as contact condensers. About 200,000 lb./hr. of saturated steam is introduced from the start-up boiler to heat the water in the reactor as a rate of less than 100° F. per hour. As the start-up steam condenses in the reactor, an equivalent amount of water is taken off to the main condenser so as to maintain reactor pressure at about 1400 p.s.i.a. While the water in the reactor is being heated, a small amount of steam from the start-up boiler is sent to the turbine to warm up the turbine and associated seals.

When the temperature of the water in the reactor reaches about 600° F. at about 1400 p.s.i.a., the rate of introduction of start-up steam to the jet pump nozzles is increased to about 840,000 lb./hr. Water remaining in the reactor is blown out through the bypass line to the main condenser. The thermopressers are now operating as steam jet pumps, circulating saturated steam in a closed loop through the core.

Production of superheated steam in the reactor core is now begun by gradually withdrawing the control rods which increases the core heat output. As superheated steam begins to pass through the thermopressers, spraying of water droplets into the thermopresser throats is begun. Gradually, as power is increased, core heat output is increased, water spray is increased, and steam flow to the jet pump nozzles is decreased until finally the thermopressers are operating entirely as steam thermopressers. As this is done, valves between the reactor and the turbine are gradually opened, admitting steam to the turbine to start the turbine rolling. At about 30% of maximum power the recirculation system has converted from jet pump to thermopresser operation and the turbine is in operation. Power is now increased to full reactor capabilities by withdrawing control rods while increasing the quantity of water sprayed into the thermopresser throats until steady state full power operation, when about $8.7 \times 10^6$ lb./hr. of water is going to the thermopressers. The startup boiler can now be put on standby.

In a controlled shut-down of the plant, the above steps are substantially reversed. Control rods are inserted to decrease core heat output. The quantity of water sprayed into the thermopressers is decreased to keep the steam leaving the thermopressers at saturation with little entrained water. When the reactor is no longer producing superheated steam, the water spray is stopped and steam from the external boiler is introduced to maintain coolant circulation by jet pump action. Finally, the core is flooded with water. At least a portion of said flooding water may be introduced through the jet pump nozzles by suitable pump and valve means (not shown). Circulation of this water can be continued as the core cools by the water-driven jet pumps. When the core is cool, the low temperature is maintained by starting the external heat exchange cooling loop and stopping feeding steam to the jet pump nozzles.

In an emergency, the reactor may be shut down by quickly fully inserting the control rods and flooding the core with water. As before, the water may be circulated by jet pump action, using water from the outside source. Water is bled off to the main condenser to maintain constant pressure within the reactor.

Although specific arrangements and proportions have been described in the above description of a preferred embodiment, other suitable arrangements and components may be used as indicated above, with similar results.

Other modifications and ramifications of the present invention will occur to those skilled in the art upon reading the present disclosure. These are intended to be included within the scope of this invention.

I claim:

1. A start-up method for a steam-cooled nuclear reactor which has a core containing heat emitting nuclear fuel material and means to vary the reactivity thereof; openings through said core for the passage of a fluid coolant; at least one thermopresser having a body comprising a converging inlet section, a throat and a diverging dffuser section arranged to permit at least a portion of the coolant exiting the core to enter the inlet section, pass through the thermopresser and return to the core; comprising the steps of
   (a) providing said reactor in shut-down, water-filled condition;
   (b) introducing steam from an outside steam source into said thermopresser through a nozzle located on the centerline of said thermopresser in said inlet section whereby said thermopresser acts first as a contact condenser and then as a jet pump heating the water in the reactor and circulating it through the core;
   (c) as steam is raised, venting a portion of said steam through piping to a condensing means;
   (d) increasing the heat output of said core by increasing reactivity thereof, whereby steam exiting the core is superheated;
   (e) beginning thermopresser operation by injecting condensate as a water spray into the superheated steam flowing through the thermopresser at the throat section thereof; and
   (f) gradually decreasing and finally stopping steam flow to the thermopresser from the outside source.

2. The method of claim 1 including the further steps of shutting down said reactor by
   (g) decreasing the heat output of said core by decreasing reactivity thereof;
   (h) introducing water into said core at least partly through said centerline nozzle; and
   (i) continuing water flow through said centerline nozzle to maintain water circulation through said core.

3. The method of claim 2 wherein during shut-down, water is passed from the reactor to a heat exchanger where it is cooled, then back to the reactor whereby the reactor is maintained at a desired temperature.

4. A nuclear reactor comprising:
   (a) a nuclear chain reacting core having passages therethrough through which coolant flows;

(b) at least one steam thermopresser comprising a body having a converging inlet section, a throat section, and a diverging diffuser section;
(c) means connecting said thermopresser to said core so that at least a portion of the coolant exiting the core passes through the thermopresser and back to the core;
(d) first nozzle means located on the centerline of said thermopresser in said inlet section upstream of said throat section to feed steam from an outside source into the thermopresser to circulate coolant through the core during plant start-up;
(e) control means to increase heat output in said core after coolant circulation has begun, to produce superheated steam; and
(f) second nozzle means located at the throat section of the thermopresser to spray finely divided water droplets into the superheated steam flow in the themopresser.

5. The nuclear reactor of claim 4 wherein said core is enclosed in a pressure vessel and a plurality of said thermopressers are located in an annulus between said core and pressure vessel.

6. The nuclear reactor of claim 5 wherein said core has an inlet plenum at the bottom thereof and an outlet plenum at the top thereof and said thermopressers are arranged in said annulus to receive superheated steam from said outlet plenum and to discharge saturated steam into said inlet plenum, whereby steam passes downwardly through said thermopressers and upwardly through said core.

7. The nuclear reactor of claim 4 wherein said second nozzle means comprises a plurality of spray nozzles located in the walls of said throat section.

8. The nuclear reactor of claim 4 wherein said second nozzle means comprises a plurality of spray nozzles on at least one manifold ring located at about said throat section, said at least one ring located coaxial with said first nozzle means whereby said first nozzle discharges through said ring into said throat section.

9. A steam thermopresser for circulating coolant in a steam-cooled nuclear reactor comprising
(a) a thermopresser body comprising a converging inlet section, a throat section, and a diverging diffuser section;
(b) spray means located at about said throat section adapted to spray finely divided water droplets into said throat section;
(c) a jet pump nozzle means located coaxially with said thermopresser body in said inlet section upstream of said throat section adapted to feed steam into said thermopresser; wherein
(d) said spray means comprises a plurality of spray nozzles on at least one manifold ring located at about said throat section, said at least one ring located coaxial with said jet pump nozzle whereby said jet pump nozzle discharges through said ring into said throat section.

References Cited
UNITED STATES PATENTS

| | | | |
|---|---|---|---|
| 3,274,065 | 9/1966 | Kierulf et al. | 176—56 |
| 3,378,456 | 4/1968 | Roberts | 176—56 |
| 3,400,047 | 9/1968 | Howard | 176—56 |
| 3,414,473 | 12/1968 | Schluderberg | 176—56 |

REUBEN EPSTEIN, Primary Examiner

U.S. Cl. X.R.

176—20, 55; 261—118